US011045906B2

(12) United States Patent
Crews (10) Patent No.: US 11,045,906 B2
(45) Date of Patent: Jun. 29, 2021

(54) COAXIAL WIRE FEED MULTI-LASER METAL DEPOSITION DEVICE

(71) Applicant: GKN Aerospace North America, Inc., Hazelwood, MO (US)

(72) Inventor: Joshua A Crews, Lake St. Louis, MO (US)

(73) Assignee: GKN Aerospace St. Louis LLC, Hazelwood, MD (US)

(*) Notice: Subject to any disclaimer, the term of this patent is extended or adjusted under 35 U.S.C. 154(b) by 421 days.

(21) Appl. No.: 15/834,546

(22) Filed: Dec. 7, 2017

(65) Prior Publication Data

US 2019/0176267 A1 Jun. 13, 2019

(51) Int. Cl.
| | |
|---|---|
| *B23K 26/342* | (2014.01) |
| *B23K 26/06* | (2014.01) |
| *B23K 26/14* | (2014.01) |
| *B23K 26/067* | (2006.01) |
| *B33Y 30/00* | (2015.01) |
| *B23K 1/005* | (2006.01) |
| *B23K 26/08* | (2014.01) |

(52) U.S. Cl.
CPC .......... *B23K 26/342* (2015.10); *B23K 1/0056* (2013.01); *B23K 26/0604* (2013.01); *B23K 26/0608* (2013.01); *B23K 26/0676* (2013.01); *B23K 26/0884* (2013.01); *B23K 26/1476* (2013.01); *B33Y 30/00* (2014.12)

(58) Field of Classification Search
CPC .............. B23K 26/342; B23K 26/0676; B23K 26/1476; B23K 26/0604; B23K 26/0884; B23K 26/0608; B23K 1/0056; B33Y 30/00
See application file for complete search history.

(56) References Cited

U.S. PATENT DOCUMENTS 6,269,540 B1 * 8/2001 Islam ................. B23K 26/0604
29/889.7
7,315,008 B2 1/2008 Wessner et al.
2002/0158048 A1 * 10/2002 Stricklen .............. B23K 9/1336
219/75

(Continued)

FOREIGN PATENT DOCUMENTS

| CN | 105543769 A | * | 5/2016 | |
| DE | 102007018400 A1 | | 10/2008 | |
| KR | 101117222 B1 | * | 3/2012 | ............. B23K 31/00 |

OTHER PUBLICATIONS

Sciaky Inc.; Advantages of Wire AM vs. Powder AM; http://www.sciaky.com/additive-manufacturing/wire-am-vs-powder-am; accessed Sep. 27, 2017.

(Continued)

*Primary Examiner* — Vishal Pancholi
*Assistant Examiner* — Bob Zadeh
(74) *Attorney, Agent, or Firm* — Bejin Bieneman PLC (57) ABSTRACT

A coaxial laser metal deposition head includes a wire guide and a plurality of laser optical units. The wire guide defines a wire guide axis. The laser optical units are distributed around the wire guide axis. Each of the laser optical units is connected to a separate laser and each defines a beam axis. The optical units are fixed relative to the wire guide and in a first condition are positioned to allow each of the beam axes to intersect the wire guide axis at a common point.

17 Claims, 8 Drawing Sheets

(56) References Cited

U.S. PATENT DOCUMENTS

| | | | |
|---|---|---|---|
| 2005/0067384 A1* | 3/2005 | Talwar | B23K 26/0604 |
| | | | 219/121.6 |
| 2009/0012475 A1* | 1/2009 | Onuki | A61B 1/00098 |
| | | | 604/164.13 |
| 2019/0176267 A1* | 6/2019 | Crews | B23K 26/342 |

OTHER PUBLICATIONS

Fraunhofer IWS; Coaxial Laser Wire Cladding Head COAXwire; http://www.iws.fraunhofer.de/en/business_fields/surface_treatment/laser_cladding/system_technology/COAX; Sep. 27, 2017.

Schelmetic, Tracey; Laser Metal Deposition with Wire Process Used for Additive Manufacturing of Large Titanium Components: p. 2 of 2; Materials & Assembly, 3D Printing, Aerospace; https://www.designnews.com/materials-assembly/laser-metal-deposition-wire-process-used-additive-manufacturing-large-titanium-components/178314790057240; Aug. 3, 2017.

GKN plc; Large Scale Deposition—Laser Wire; http://www.gkngroup.com/additive-manufacturing/processes-applications/GKN-Aerospace/Pages/large-scale-deposition-laser-wire.aspx; accessed Sep. 27, 2017.

GKN plc; GKN Aerospace and Oak Ridge National Laboratory Join Forces on Additive Manufacturing; https://www.gkn.com/en/newsroom/news-releases/aerospace/2017/gkn-aerospace-and-oak-ridge-national-laboratory-join-forces-on-additive-manufacturing/; Jun. 19, 2017.

International Search Report and Written Opinion for PCT/IB2018/059758 dated May 29, 2019 (13 pages).

\* cited by examiner

COAXIAL WIRE FEED MULTI-LASER METAL DEPOSITION DEVICE

BACKGROUND

Laser metal deposition systems ("LMD systems") are used to build a work piece by deposition of molten metal in subsequent layers to form the work piece into a desired shape. LMD systems may using wire as a metal feedstock (i.e., "LMDw systems"). LMDw systems focus a laser's light beam, i.e., a laser beam, on a work surface of the work piece. The laser beam creates a metal melt puddle into which the wire is fed. The wire is commonly fed into the path of the laser beam and the melt puddle at an acute angle to both the work surface and the laser beam. Coordinated and substantially constant relative movement between the work surface and the laser beam and the wire controls the shape of the work piece being built. Such coordinated movement must be accommodated by an ability to appropriately position the laser and the incoming wire, with such coordinated movement being especially challenging for certain geometric configurations (e.g., corners). A coaxial system simplifies the coordination requirement by having the wire feed in at an angle normal to the work surface. A known coaxial system splits the laser beam into three equal lower energy laser beams by laser optics to facilitate the deposition of metal for challenging geometries. The optics direct the three laser beams at a common target, with beams being at an acute angle to the work surface, and being evenly distributed about an axis defined by the wire feed. However, known coaxial systems are limited by the laser optics and are underpowered for some applications, requiring more time to build a work piece than is desired. It is desired to provide a more broadly useful coaxial LMDw system.

DESCRIPTION

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A coaxial laser metal deposition head includes a wire guide and a plurality of laser optical units. The wire guide defines a wire guide axis. The laser optical units are distributed around the wire guide axis. Each of the laser optical units is connected to a separate laser and each defines a beam axis. The optical units are fixed relative to the wire guide and in a first condition are positioned to allow each of the beam axes to intersect the wire guide axis at a common point.

The laser optical units may be substantially evenly spaced about the wire guide axis.

The head may also include a mounting plate having a center portion and a plurality of laser support arms. The center portion may have an aperture therethrough substantially concentric with the wire guide axis. The plurality of laser support arms may be aligned with the laser optical units, and radiate out from the center portion and may be oriented at an obtuse angle to the center portion. Each of the laser optical units may be fixed to one of the arms.

The head may further include a hinged pivot mechanism disposed between and connecting one of the arms and the laser optical unit mounted thereon. The pivot mechanism may define a hinge axis and allow the beam axis to be moved away from the common point.

The head may include an adjusting screw spaced from the hinge axis. Operation of the pivot mechanism rotates the adjusting screw, pivoting the laser optical unit about the hinge axis.

The head may further include a rotary indexing mechanism defining a rotary axis. The rotary indexing mechanism may be disposed between and connect one of the arms and the laser optical unit mounted thereon. The rotary indexing mechanism may include a rotary indexing member and an electric motor drivingly connected thereto.

The head may include a position adjustment mechanism disposed between the wire guide and one of the laser optical units.

The wire guide may be a tube for receiving a feedstock wire.

The head may further include a feed channel connected to the wire guide at an angle allowing the wire guide to receive the wire from the feed channel at an obtuse angle.

The head may further include a heat shield disposed between the laser optical units and a work surface.

A coaxial wire feed multi-laser metal deposition system may include a head, a robot arm and a programmable computing device. The head may further include a mounting plate, a plurality of laser optical units, a wire guide and a wire feed tip. The mounting plate may include a center portion and a plurality of laser support arms. The center portion may have an aperture therethrough. The aperture through the center portion may define a first axis substantially normal to the center portion. The laser support arms may radiate out from the center portion and may be oriented at an obtuse angle to the center portion. The laser optical units may be equal in number to the laser support arms and may be mounted on each support arm. Each of the laser optical units may be connected to a separate laser power unit and each of the optical units may define a laser beam axis. The wire guide may be fixed to the center portion and substantially coaxial with the first axis. The wire feed tip may be connected to the mounting plate and substantially concentric with the first axis. The robot arm may be connected to the head. The programmable computing device may be connected to the robot arm and the head.

The plurality of arms of the system may be one of two and three and four.

The arms of the system may be substantially evenly spaced about the first axis.

The system may further include a wire guide for receiving a feedstock wire. The wire guide may have a wire guide axis substantially coaxial with the first axis. The wire guide may be fixed to the center portion.

The system may further include a feed channel connected to the wire guide at an angle allowing the wire guide to receive the wire from the feed channel at an obtuse angle.

The system may further include a heat shield disposed between the mounting plate and a work surface.

The laser beam axes of the system may intersect the first axis at the common point in the first condition.

The system may further include a hinged pivot mechanism disposed between and connecting one of the arms and the laser optical unit mounted thereon. The pivot mechanism may define a hinge axis, and allow the beam axis to be moved away from the common point.

The pivot mechanism of the system may include an adjusting screw spaced from the hinge axis. Operation of the pivot mechanism may rotate the adjusting screw, pivoting the laser optical unit about the hinge axis.

The system may further include a rotary indexing mechanism defining a rotary axis and disposed between and connecting one of the arms and the laser optical unit mounted thereon. The rotary indexing mechanism may include a rotary indexing member and an electric motor drivingly connected thereto.

An example coaxial laser metal deposition head 10 of a coaxial wire feed multi-laser deposition system 12 is illustrated in FIGS. 1-8.

Figure 4:
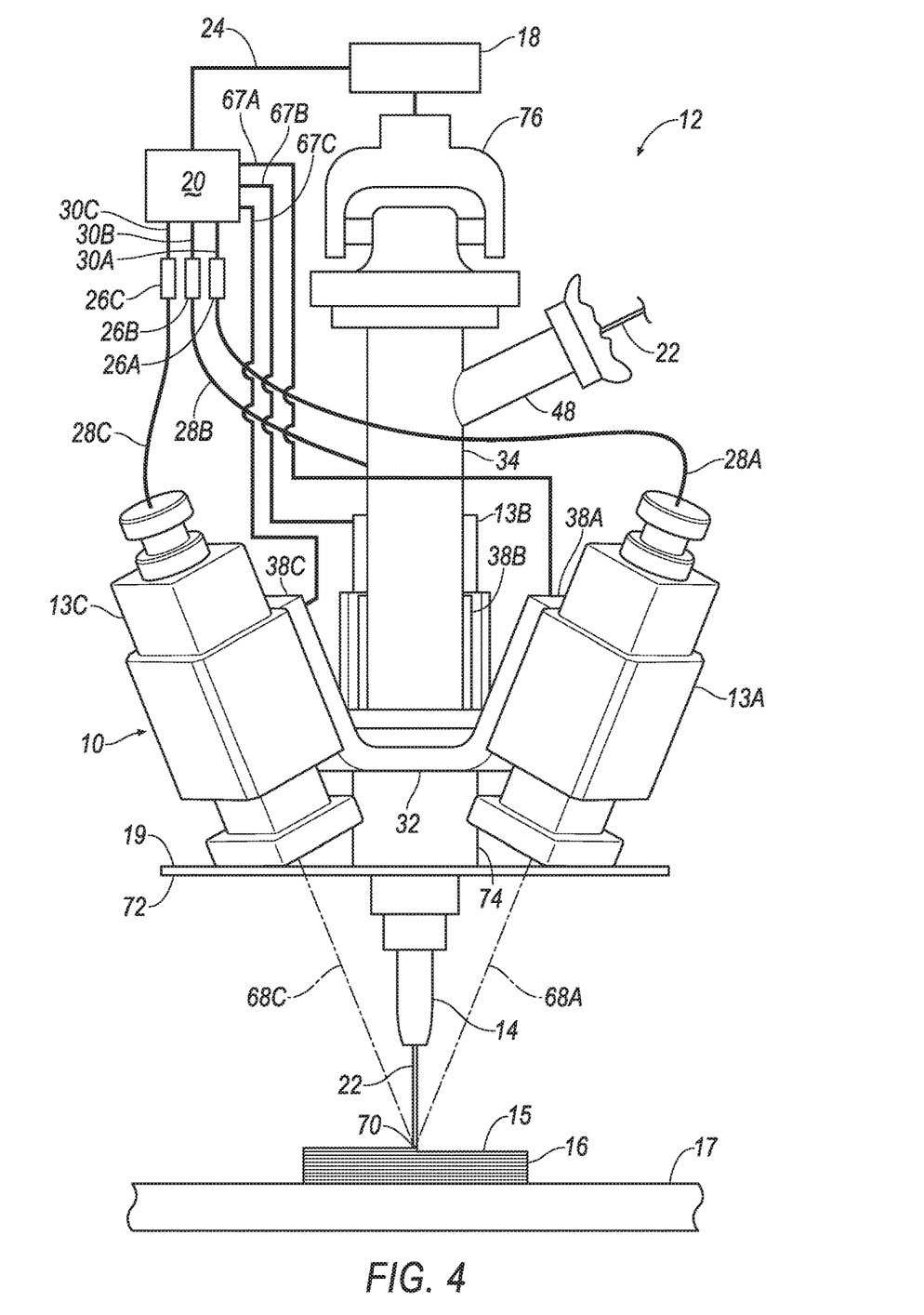
FIG. 4 is a schematic view of an example coaxial wire feed multi-laser metal deposition system including the head of FIG. 1.

As best shown in FIG. 4, the head 10 includes a plurality of laser units 13A, 13B and 13C and a wire feed tip 14. In operation, the head 10 is positioned relative to a work surface 15 that may be defined by a workpiece 16 formed on a work plate 17. To facilitate such positioning, the head 10 may be configured for mounting at an end of a robot arm 18. The robot arm 18 may position the head 10 relative to the work plate 17. The system 12 may further include a heat shield 19, a wire feeding machine (not shown), a work plate positioning mechanism (not shown), a system controller 20, i.e., a programmable computing device, for controlling operation of the system 12, e.g., positioning the head 10, positioning the work plate 17, positioning the laser units 13A, 13B, 13C, establishing a wire feed rate of a feedstock wire 22, responsive to computer instructions, i.e., computer software, and a robot control link 24 between the controller 20 and the robot arm 18. The controller 20 may include both a memory for storing instructions and a processor for executing the instructions. The laser units 13A, 13B, 13C may each be a laser optical unit connected to its own laser power unit 26A, 26B, 26C by an optical fiber 28A, 28B, 28C. Alternatively, the laser units 13A, 13B and 13C may incorporate the laser power units 26A, 26B and 26C. A control cable 30A, 30B, 30C may connect each laser power unit 26A, 26B and 26C with the controller 20.

The head 10 includes a mounting plate 32. The plurality of laser units 13A, 13B and 13C, are fixed to plate 32. An example number of laser units 13A, 13B, 13C is three, but may alternatively be two or four. A wire guide 34 is fixed to the mounting plate 32. The wire guide 34 defines a wire guide axis 36 best shown in FIG. 1. The laser units 13A, 13B, 13C may be evenly spaced about the axis 36, e.g., 120° apart for three laser units 13A, 13B, 13C.

Figure 1:
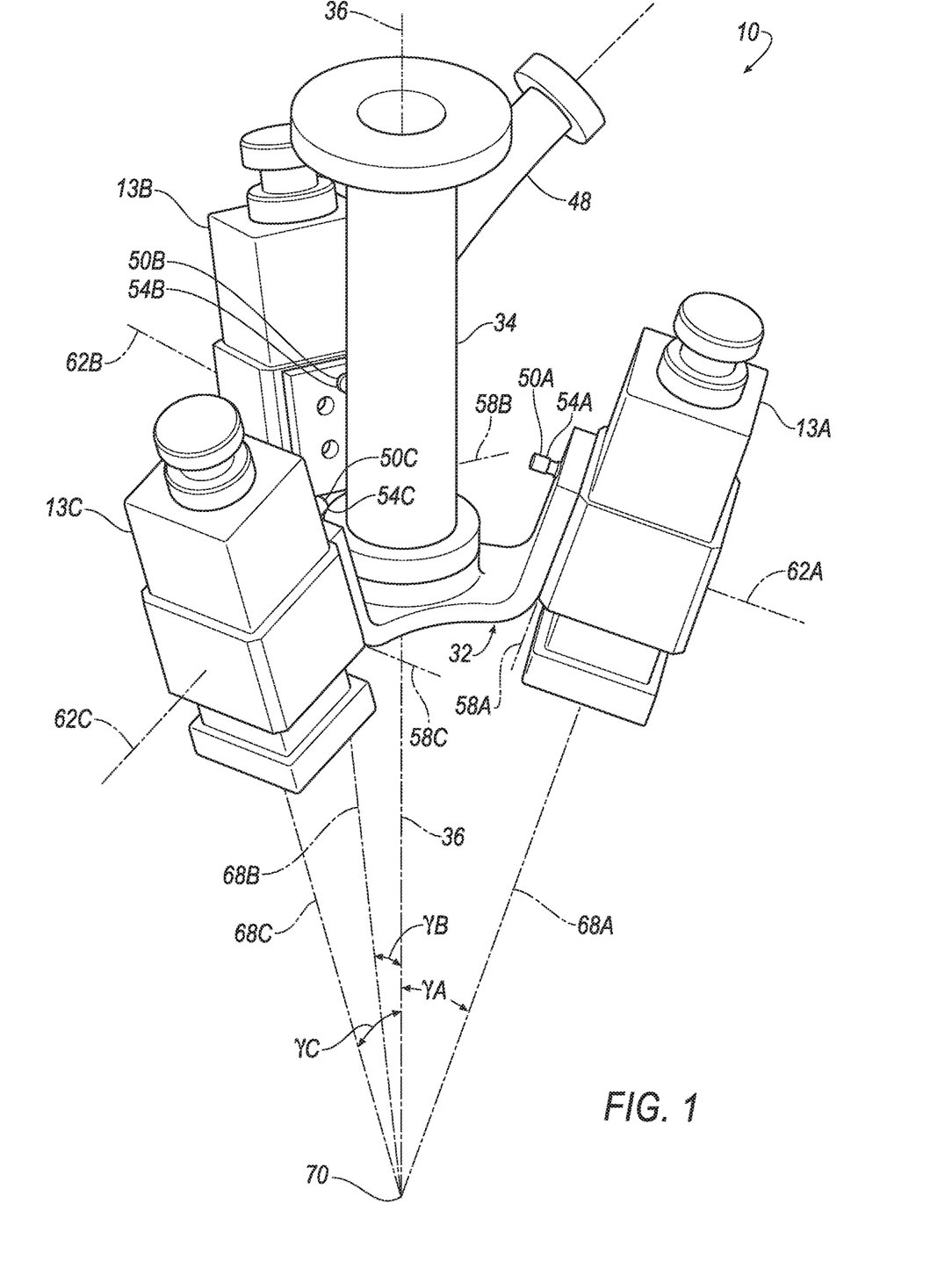
FIG. 1 is a perspective view of an example embodiment of a coaxial laser metal deposition head.
Figure 2:
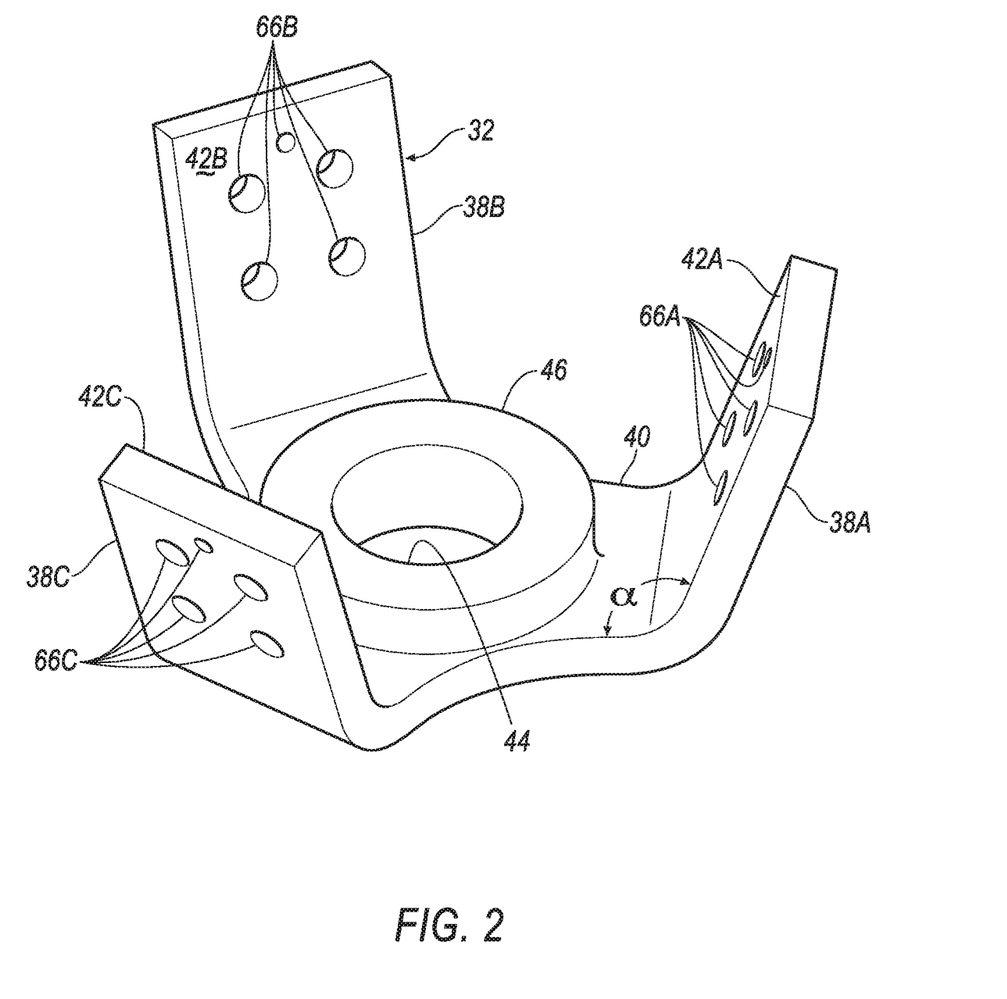
FIG. 2 is a perspective view of the head of FIG. 1.
Figure 3:
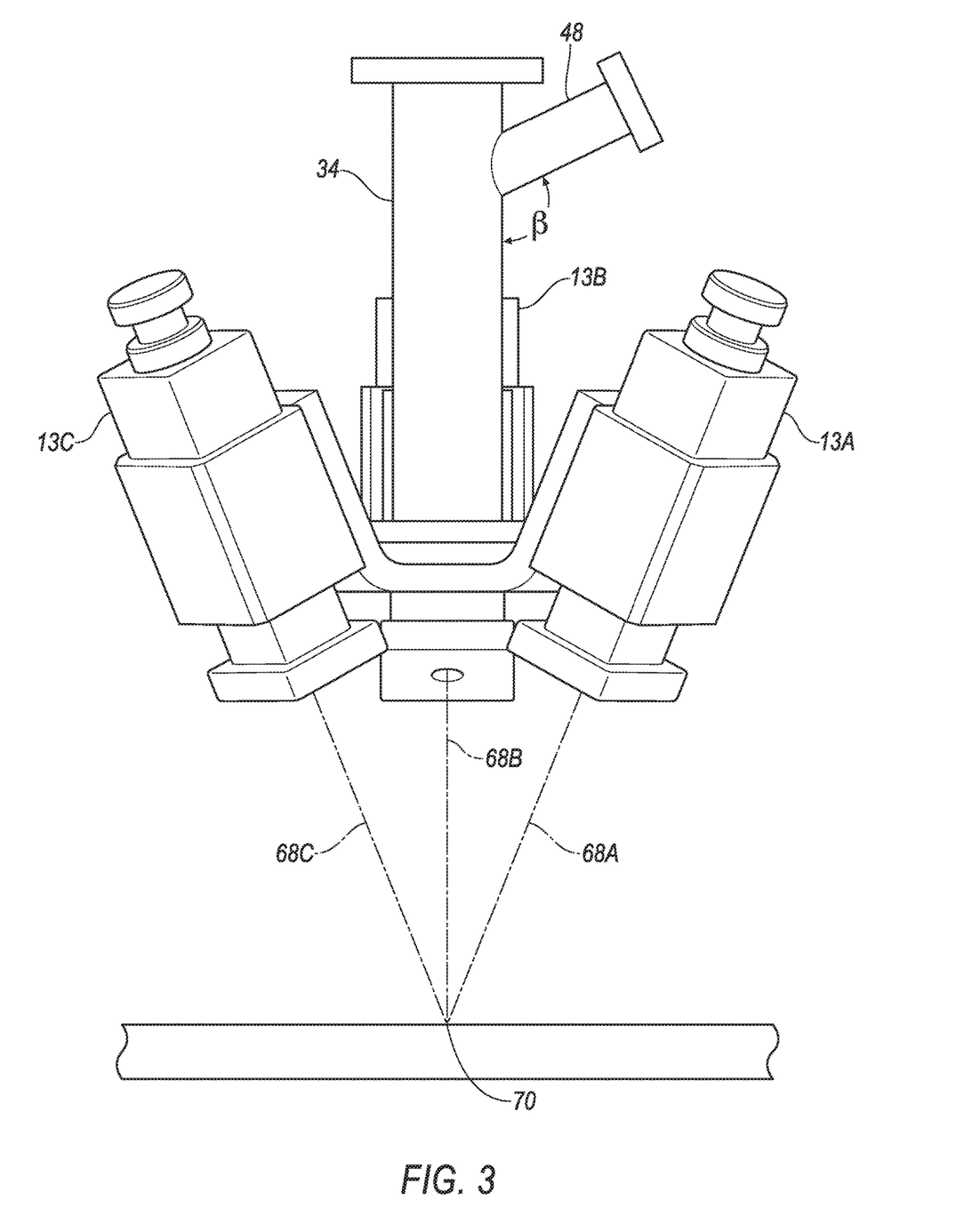
FIG. 3 is a side view of the head of FIG. 1 and an associated work plate.

The mounting plate 32, best shown in FIG. 2, may include a plurality of integrally formed laser support arms 38A, 38B and 38C, one for each laser unit 13A, 13B, 13C. The arms 38A, 38B, 38C may extend radially from a substantially planar center portion 40 of the mounting plate 32. The support arms 38A, 38B, 38C may be equal in number to the number of laser units 13A, 13B, 13C. The arms 38A, 38B, 38C may, on an inboard side 42A, 42B, 42C respectively, be at an obtuse angle α to the center portion 40.

The plate 32 includes a center aperture 44 through the center portion 40 substantially coaxial with the wire guide axis 36. A mounting boss 46 surrounding the aperture 44 may be on the same side of the plate 32 as the inboard sides 42A, 42B, 42C.

The wire guide 34 may include a wire feed channel 48 connected thereto 34, allowing entry of a feedstock wire 22 into the wire guide 34. The channel 48 may be in the form of a tube having an internal passage connecting to an internal passage within the wire guide 34. The channel 48 may be connected to the guide 34 at an angle β to the wire guide axis 36, with the angle β being an obtuse angle. The angle β facilitates a transfer of the feedstock wire 22 from the channel 48 to the guide 34, aiding in reducing the potential for binding and kinking of the wire 22 as the wire 22 is being fed to the work surface 15 of the workpiece 16.

Figure 5:
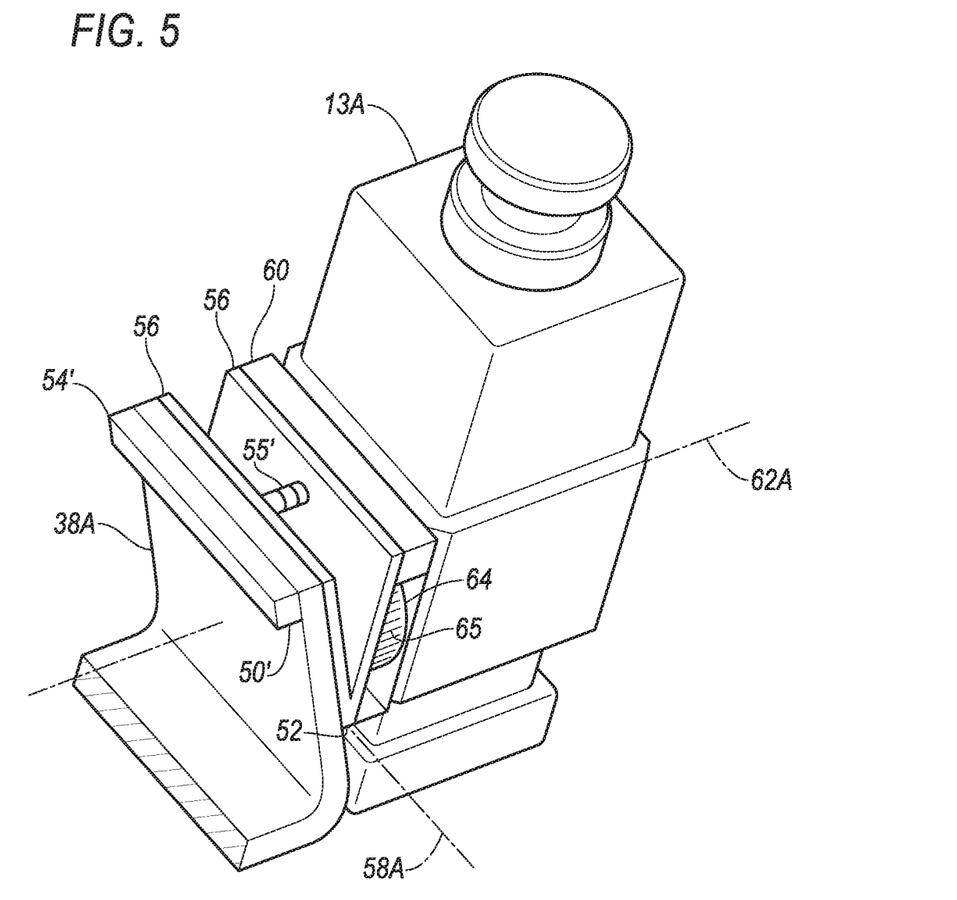
FIG. 5 is a perspective view of an example arm of the head of FIG. 1.

A first position adjustment mechanism, e.g., a hinged pivot mechanism 50A, 50B, 50C, may be disposed between each of the laser units 13A, 13B, 13C and the support arms 38A, 38B, 38C. An example pivot mechanism 50A, 50B, 50C may include an axial displacement mechanism 54A, 54B, 54C, e.g., a micrometer-type fine-pitch adjusting screw 54A, 54B, 54C in combination with a hinge 52. An alternative embodiment of the axial displacement mechanism 54', forming part of a pivot mechanism 50' that may be mounted to each of arms 38A, 38B, 38C, is illustrated in FIG. 5. Displacement mechanism 54' may include an electrically operated actuator to drive an adjusting screw 55' responsive to electrical command signals from the controller 20.

The hinge 52, best shown in FIG. 5, may have a pair of hinge plates 56, one hinge plate 56 connected to the optical unit 13A, 13B, 13C and the other hinge plate 56 connected to the corresponding arm 38A, 38B and 38C. The hinge 52 on each arm 38A, 38B, 38C defines a hinge axis 58A, 58B, 58C about which the optical unit 13A, 13B, 13C may pivot relative to the arm 38A, 38B, 38C. The hinge axis 58A, 58B, 58C may be at an end of the arm 38A, 38B, 38C opposite a location to the axial displacement mechanism 54',54A, 54B, 54C. The figures show the axial displacement mechanism 54',54A, 54B, 54C near an end of the arm 38A, 38B, 38C distal to the center portion 40, and the hinge axis 58A, 58B, 58C near an opposite end of the arm 38A, 38B, 38C proximate to the center portion 40. Alternatively, the axial displacement mechanism 54',54A, 54B, 54C may be near the end of the arm 38A, 38B, 38C proximate to the center portion 40, and the hinge axis 58A, 58B, 58C may be near the end of the arm 38A, 38B, 38C distal to the center portion 40. The hinge 52 may be of any type that allows pivoting about the axis 58A, 58B, 58C, e.g., a pin hinge, and a living hinge. Displacement of the screw 54A, 54B, 54C, 55' causes pivoting of the optical unit 13A, 13B, 13C about axis 58A, 58B, 58C.

A second position adjustment mechanism, e.g., a rotary indexing mechanism, such as an example mechanism 60 shown on arm 38A in FIG. 5, may also be provided between each optical unit 13A, 13B, 13C and the associated arm 38A, 38B, 38C to provide each unit 13A, 13B, 13C with a second degree of freedom relative to the arm 38A, 38B, 38C. The rotary indexing mechanism 60 may include a rotary indexing member 64 (e.g., a plate or a shaft) disposed between the optical unit 13A, 13B, 13C and the arm 38A, 38B, 38C. The indexing member 64 may rotate about a rotary axis 62A, 62B, 62C. Rotary axis 62A, 62B, 62C may be normal to a one of the arm 38A, 38B, 38C and the hinge plate 56 to which the rotary indexing mechanism 60 is mounted. The rotary indexing mechanism 60 may include teeth 65 on an outer diameter of the indexing member 64 engaged by a worm screw (not shown). A rotary position of the indexing member 64 relative to one of the arm 38A and the optical unit 13A, 13B, 13C may be changed by manually rotating the worm screw or by actuating an electric motor that may be part of the mechanism 60 to drive the worm screw. An example alternative commercially available rotary indexing mechanism is found in rotary actuators available from PI (Physik Instrumente) L.P. of Auburn, Mass. and Eschbach, Germany, and particularly their UPR-100, UPR-120 and UPR 160 family of actuators. The rotary indexing mechanism may have a maximum rotary displacement rate of between 90 degrees per second and 720 degrees per second.

The adjustment mechanisms 50, 50',60 may be connected to the controller 20 by a communications link. FIG. 4 illustrates a plurality of connecting communication cables 67A, 67B, 67C as exemplary links. Alternatively, the communications link may be provided over a multiplexed network, or wirelessly (e.g., Bluetooth).

The arms 38A, 38B, 38C as best shown in FIG. 2 are provided with a plurality of mounting apertures 66A, 66B, 66C. The apertures 66A, 66B, 66C may include apertures for fixing any of the laser unit 13A, 13B, 13C, the pivot mechanism 50A, 50B, 50C or the rotary indexing mechanism 60, e.g. the rotary indexing member, to the arms 38A, 38B, 38C. Although the apertures 66A, 66B, 66C are shown as through holes, they may alternatively be blind holes and may be threaded.

The laser optical units 13A, 13B, 13C each define a laser beam axis 68A, 68B, 68C respectively. Laser beams transmitted by the optical units 13A, 13B, 13C follow the axes 68A, 68B, 68C. Pivoting the laser optical units 13A, 13B, 13C about the hinge axes 58A, 58B, 58C changes an angle γA, γB, γC between the laser beam axis 68A, 68B, 68C, respectively, and the wire guide axis 36.

In a first condition, with a common value for γA, γB, γC, the laser beam axes 68A, 68B, 68C all intersect the wire guide axis 36 at a common point 70. The common point 70 may be adjusted along the wire guide axis 36 by uniformly adjusting the pivot mechanism 50A, 50B, 50C to vary the values of γA, γB, γC equally for all of the optical units 13A, 13B, 13C, combined with adjusting a focal length of the optical units 13A, 13B, 13C. Such adjustments of the focal lengths may be achieved electronically with an electronic focus actuator (not shown) incorporated into each optical unit 13A, 13B, 13C. The rotary indexing mechanisms 60 may be used to further change the orientation of a laser beam axis 68A, 68B, 68C relative to the wire guide axis 36.

The heat shield 19 may include a reflector plate 72 and a heat sink 74. The heat sink 74 may be liquid, e.g., water, cooled, with a flow rate selected to maintain temperatures within a predetermined range. The heat sink 74 may also be integrated into the mounting plate 32. The reflector plate 72 may include beam apertures (not shown) to accommodate the passage of laser beams along axes 68A, 68B, 68C from the laser optical units 13A, 13B, 13C to the work surface 15.

The robot arm 18 may be connected to the head 10 by a wrist-type manipulator 76. The manipulator 76 allows multiple degrees of rotational freedom in orienting the head 10, facilitating a selective location of the common point 70. Such manipulators 76 are commercially available.

The system 12 may be used as a three-dimensional printer to form metal parts, i.e., workpieces 16, from the feedstock wire 22. The feedstock wire 22 is received by the channel 48 and fed through the guide 34, out of the tip 14 and to the work surface 15. A rate of feed of the feedstock wire 22 through the tip 14 may be controlled by commands from the controller 20 communicated to the wire feeding machine (not shown). The rate of feed (e.g. 1 meter/minute to 10 meters/minute) of the feedstock wire 22 into a melt puddle on the work surface 15 may depend on system parameters including a diameter of the feedstock wire 22, e.g., between 0.5 and 2.0 millimeters, and a maximum available power range of the laser units 13A, 13B, 13C. Such commands may be generated by the controller's processor in executing instructions stored in the controller's memory.

The system 12 may operate in a substantially coaxial mode, with all of the laser units 13A, 13B, 13C directed to the common point 70, with the common point 70 being on the work surface 15 and coincident with the melt puddle. With the laser beam axes 68A, 68B, 68C so directed, the feedstock wire 22 melts at the work surface 15 to form a bead 77, i.e., a layer, over an earlier work surface of the workpiece, and, in the case of the first layer, over the work plate 17. The substantially coaxial mode of operation greatly facilitates the formation of complex patterns with the head 10.

The use of independent laser units 13A, 13B, 13C allows the use of a greater magnitude of net laser power. The rate at which objects may be formed by the LMD process, i.e., the rate at which metal can be fed to the work surface 15 and melted, depends on the amount of laser power available to melt the incoming feedstock wire 22. A head using a single laser with a power rating of 4 kilowatts in combination with a three-way optical splitter may be limited to forming at rates allowed by 4 kilowatts of power or less. The use of separate, multiple laser units 13A, 13B, 13C without a need for an optical splitter allows an application of more laser energy to the work surface 15. For example, with three laser units 13A, 13B, 13C each rated at 25 kilowatts, a net energy available at the work surface 15 becomes 75 kilowatts. Lower power laser units 13A, 13B, 13C, e.g., laser units have a power range of 1000 watts to 10,000, may alternatively be selected based on system forming needs, e.g., when forming relatively thinner-walled parts. The multi-laser system 12, when incorporating lasers providing more collective power than can be provided with a beam-splitting system, may be used to form large parts in a small fraction (e.g., one tenth) of the time needed to form the parts with the beam-splitting system.

Figure 6:
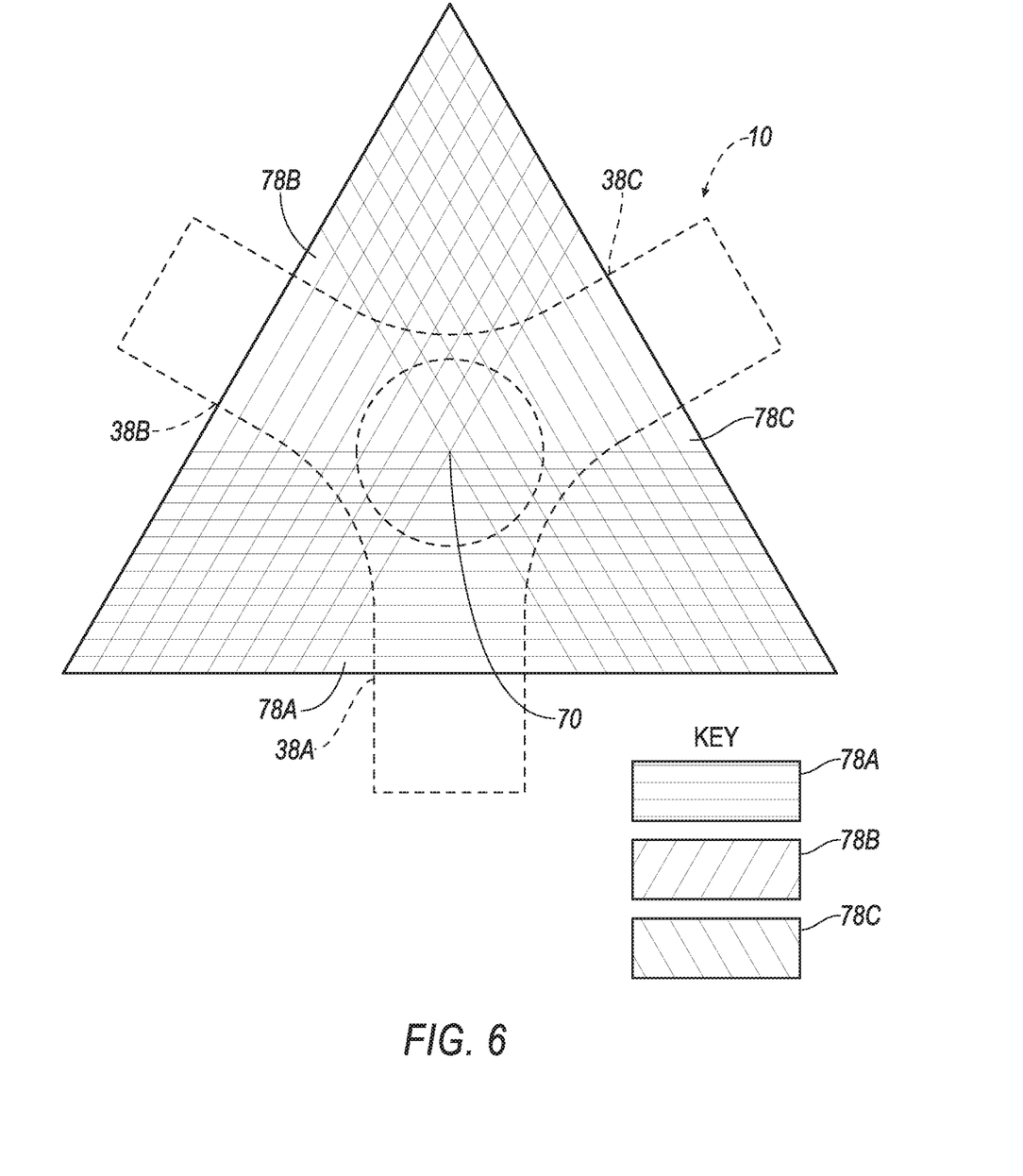
FIG. 6 is an example available target area for the head of FIG. 1.

Controlled movement of the optical units 13A, 13B, 13C about their respective hinge axes 58A, 58B, 58C and rotary axes 62A, 62B, 62C allows the laser beam axes 68A, 68B, 68C to reach any point within an example respective available target area 78A, 78B, 78C best shown in FIG. 6. The target areas 78A, 78B, 78C partially overlap the adjacent target areas 78A, 78B, 78C. The target areas 78A, 78B, 78C are illustrated as not extending past the common point 70 to avoid intersecting the feedstock wire 22 above the common point 70. The only location where the illustrated target areas 70A, 70B, 70C all overlap each other is at the common point 70. The target areas 78A, 78B, 78C and the amount of area overlap may be increased by allowing the beam axes 68A, 68B, 68C to move past the common point 70. When the beam axes 68A, 68B, 68C extend past the common point 70, the controller 20 may be programmed to depower or turn off a laser unit 13A, 13B, 13C when its beam axis 68A, 68B, 68C is directed at the feedstock wire 22 above the common point 70 to avoid unintentionally severing the feedstock wire 22 or damaging the tip 14. The shield 19 must also be configured to accommodate the possible paths of the laser beams.

Figure 7:
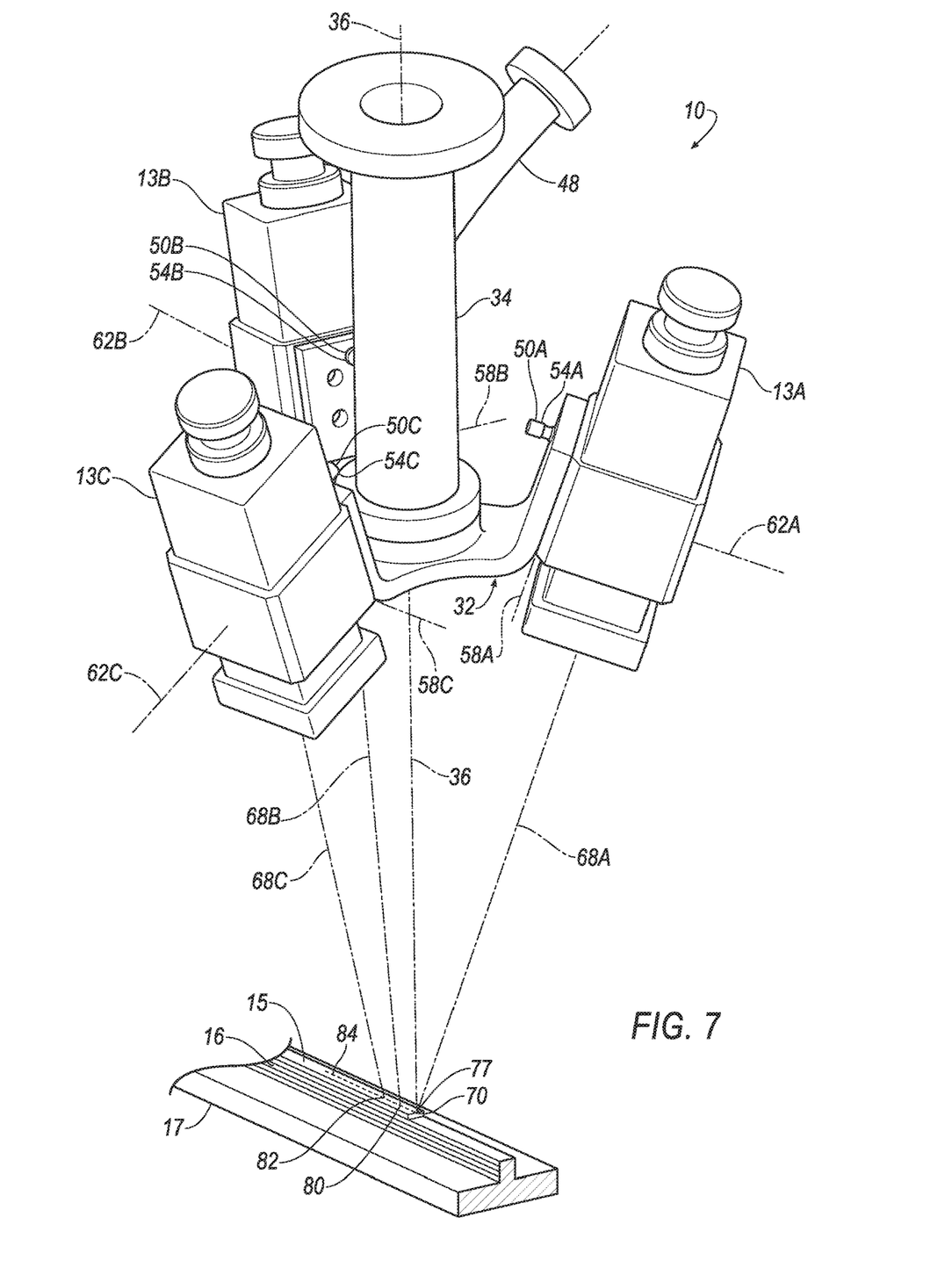
FIG. 7 is a perspective view of the head of FIG. 1 operating in a second example condition.

Points where the beam axes 68A, 68B, 68C intersect the work surface 15 may be adjusted, through the actuation of adjustment mechanisms 50A, 50B, 50C and 60 to alternative non-coaxial arrangements. For example, as illustrated in FIG. 7, beam axis 68A may be directed at the common point 70, the beam axis 68B may be directed at a second point 80 behind common point 70, and the beam axis 68C may be directed at a third point 82 behind the second point 80, and all three points 70, 80, 82 may be on a common bead line 84.

The above trailing-point arrangement allows alternative uses of each laser beam that improve the control and the quality of the metal deposition process. For example, a cooling rate of the melt puddle may be controlled to achieve a graduated cooling by having the laser unit 13B directed at the second point 80 operate at a lower power level than the laser unit 13A directed at the common point 70, and the laser unit 13C directed at the third point 82 operate at a lower power level than the laser unit 13B. Alternatively, the power to the trailing lasers units 13B, 13C may, responsive to a bead quality sensor (not shown, e.g., an X-ray emitter/sensor) detecting a flaw in a bead just laid, be selectively increased to correct the detected flaw. The bead quality sensor is connected to the controller 20 for electronic communication therewith.

Figure 8:
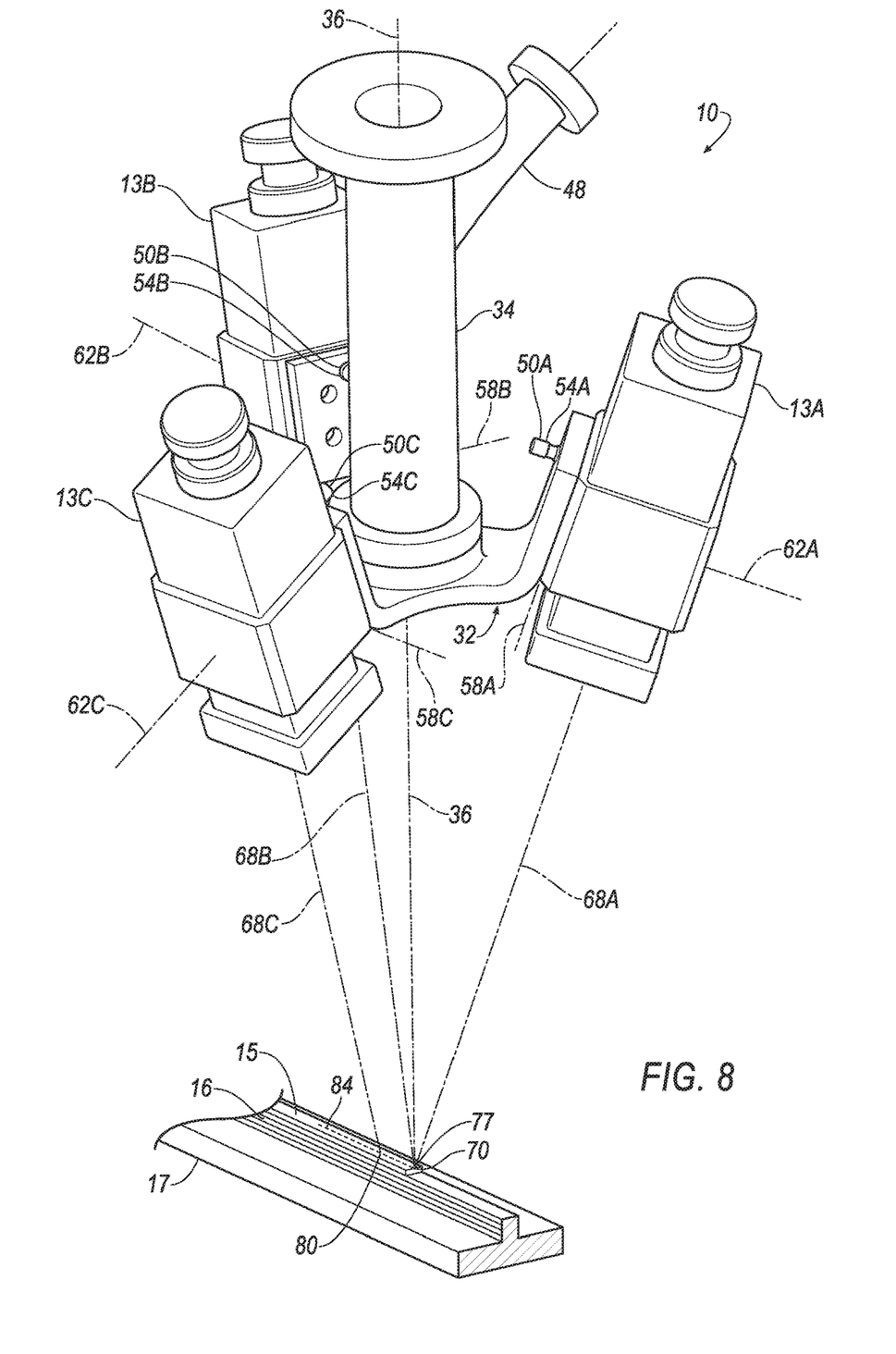
FIG. 8 is a perspective view of the head of FIG. 1 operating in a third example condition.

In yet another alternative positioning option illustrated in FIG. 8, the laser units 13A, 13B, 13C may be selectively positioned to all focus on the common point 70 as a default condition. Responsive to detection of a flaw in a bead just laid, one of the laser units 13C may have its beam axis 68C directed toward the flaw at the second point 80 on the bead line 84 to remelt the bead at the flaw, correcting the flaw.

The system 12 may operate according to the following steps. A virtual model of the workpiece 16 is created in software code. The virtual model may be loaded into the controller 20 and stored in the controller's memory. The controller 20 is programmed with instructions, also stored in the controller's memory, to build the workpiece 16 in accord with the virtual model. The feedstock wire 22 is selected to provide both an appropriate thickness gauge and a type of metal (e.g., titanium, steel, aluminum) consistent with the work piece 16 design. The feedstock wire 22 is loaded into the wire feeding machine, with one end being passed through the wire feed channel 48, into the wire guide 34 and out through the tip 14. The robot arm 18 positions the head, and more particularly the tip 14, at a start point on the work plate 17. The start point is selected so that the workpiece 16 will fit on the work plate 17.

The work plate 17 may be fixed to ground and remain stationary throughout the building of the workpiece 16. Alternatively, the work plate 17 may be connected to a positioning device, e.g., a robot arm, to allow movement of the work plate 17 relative to the head 10. As gravity may be exploited to provide a force biasing a fresh bead against the workpiece 16, relative movement of the work plate 17 may allow a change of an angle between adjacent surfaces of the workpiece 16, allowing workpieces 16 of more complex shapes to be built.

Building of the workpiece 16 is initiated at the start point. The start point is the initial location of the common point 70. The laser optical units 13A, 13B, 13C may all have their beam axes 68A, 68B, 68C directed to the common point 70. The laser power units 26A, 26B, 26C are energized responsive to instructions from the controller 20, causing the wire 22 to melt and initiate formation of the workpiece 16 with a first bead as the head 10 moves relative to the work plate 17.

As illustrated in FIG. 8, and described above, one of the laser optical units (e.g., 13C) may have its beam axis 68C diverted from the common point 70 to remelt the just-laid bead to correct any defects that may be sensed by the bead quality sensor. Power to the laser power units 26A, 26B, 26C may be modulated by the controller 20 as is suited to the fabrication demands. To achieve such modulation, the controller 20 may vary the power distribution between the power units 26A, 26B, 26C, with each power unit receiving a different magnitude of power than the others, or all receiving the same. The workpiece 16 may be thus, at least in part, formed by repositioning one of the laser optical units 13C to direct its beam axis 68C at the point 80 on the bead line 84 of the workpiece 16 different from the point 70 on the bead line 84 at which the other laser beam axes 68A, 68B are directed.

As illustrated in FIG. 7, and described above, the beam axes 68A, 68B, 68C may all be directed to different points 70, 80, 82 along the line 84 to achieve a managed cooling rate of a freshly-laid bead (i.e., layer) of metal, and to also correct any detected defects. When operating as illustrated in FIG. 7, the controller 20 may, when there is a relative head 10-to-work plate 17 directional change, select a different one of the laser optical units 13A, 13B, 13C to direct its beam axis 68A, 68B, 68C axis at the common point 70. The ability to reposition the axes 68A, 68B, 68C, in combination with the ability of the wrist manipulator 76 to rotatively reposition the head 10, allows the system 12 to substantially continuously direct the beam axes 68A, 68B and 68C along the line 84 on the work surface 15 even the work surface includes more complicated geometric transitions, e.g., a sharp corner, requiring more complex maneuvers by the head 10. The workpiece 16 may be thus, at least in part, formed by repositioning one of the laser optical units 13C to direct its beam axis 68C at the point 82 on the bead line 84 of the workpiece 16 different from the points 70, 80 on the bead line 84 at which the other laser beam axes 68A, 68B are directed. The workpiece 16 may also be formed by selectively repositioning each of the laser optical units 13A, 13B, 13C to direct the associated laser beam axes 68A, 68B, 68C at separate, i.e., separated by distance, points 70, 80, 82 on the bead line 84.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The multiple individual embodiments expressly disclosed are exemplary and are not intended to be limiting with regard to combinations of the embodiments and the features thereof.

What is claimed is:

1. A coaxial laser metal deposition head comprising:
    a wire guide defining a wire guide axis, for receiving a feedstock wire; and
    a plurality of laser optical units distributed around the wire guide axis and each connected to a separate laser for melting the feedstock wire passed through the wire guide, and each defining a beam axis, the optical units fixed relative to the wire guide and in a first condition positioned to allow each of the beam axes to intersect the wire guide axis at a common point;

wherein at least one of the laser optical units from the coaxial laser metal deposition head is configured to have the respective beam axis diverted from the common point by a pivot mechanism, located on the coaxial laser metal deposition head, in response to an electrical command signal from a controller.

2. The head of claim 1, wherein the laser optical units are substantially evenly spaced about the wire guide axis.

3. The head of claim 1, further comprising a mounting plate having:
 a center portion with an aperture therethrough substantially concentric with the wire guide axis; and
 a plurality of laser support arms aligned with the laser optical units and radiating out from the center portion and oriented at an obtuse angle to the center portion,
 wherein each of the laser optical units is fixed to one of the arms.

4. The head of claim 3, wherein the pivot mechanism comprises a hinged pivot mechanism disposed between and connecting one of the arms and the laser optical unit mounted thereon, the pivot mechanism defining a hinge axis and allowing the beam axis to be moved away from the common point.

5. The head of claim 4, wherein the pivot mechanism includes an adjusting screw spaced from the hinge axis, and operation of the pivot mechanism rotates the adjusting screw and pivots the laser optical unit about the hinge axis.

6. The head of claim 5, further comprising a rotary indexing mechanism defining a rotary axis and disposed between and connecting one of the arms and the laser optical unit mounted thereon and the rotary indexing mechanism including a rotary indexing member and an electric motor drivingly connected thereto.

7. The head of claim 1, further comprising a position adjustment mechanism disposed between the wire guide and one of the laser optical units.

8. The head of claim 1, wherein the wire guide is a tube for receiving a feedstock wire.

9. The head of claim 8, further comprising a feed channel connected to the wire guide at an angle allowing the wire guide to receive the wire from the feed channel at an obtuse angle.

10. The head of claim 1, further comprising a heat shield disposed between the laser optical units and a work surface.

11. The head of claim 10, wherein the wire guide comprises a tip, wherein the heat shield is disposed between the tip and the laser optical units.

12. The head of claim 10, wherein the heat shield comprises apertures for accommodating the passage of laser beams along the beam axes from the plurality of laser optical units to the work surface.

13. The head of claim 1, wherein the wire guide comprises a tip, wherein the head is configured to accommodate the tip between the laser optical units and a work surface.

14. The head of claim 1, wherein each of the laser optical units is configured to have the respective beam axis diverted from the common point, by the pivot mechanism on the coaxial laser metal deposition head, in response to an electrical command signal from the controller.

15. The head of claim 14, wherein each of the laser optical units is configured to have the respective beam axis diverted from the common point, by the pivot mechanism on the coaxial laser metal deposition head, and independently of the remaining laser optical units from the plurality of optical units, in response to an electrical command signal from the controller.

16. The head of claim 1, wherein the pivot mechanism is connected to the controller by a communications link.

17. The head of claim 1, wherein the pivot mechanism is connected to the controller by a wireless communications link.

* * * * *